(12) United States Patent
Bruckbauer

(10) Patent No.: US 7,231,939 B1
(45) Date of Patent: Jun. 19, 2007

(54) BLEED VALVE SYSTEM FOR MOTORCYCLE SUSPENSIONS

(76) Inventor: John Bruckbauer, 3410 W. Alamo Pl., Littleton, CO (US) 80123

( * ) Notice: Subject to any disclaimer, the term of this patent is extended or adjusted under 35 U.S.C. 154(b) by 132 days.

(21) Appl. No.: 11/076,676

(22) Filed: Mar. 9, 2005

(51) Int. Cl.
*F16K 17/00* (2006.01)
(52) U.S. Cl. .............................. 137/614.11; 137/614.18
(58) Field of Classification Search .......... 137/614.11, 137/614.18, 198, 199
See application file for complete search history.

(56) References Cited

U.S. PATENT DOCUMENTS

| 1,313,554 | A |   | 8/1919  | Nielsen     |         |
|-----------|---|---|---------|-------------|---------|
| 1,991,974 | A |   | 2/1935  | Broedecker  |         |
| 3,984,119 | A | * | 10/1976 | Okazima     | 280/276 |
| 4,687,022 | A | * | 8/1987  | Iverson     | 137/531 |
| 5,301,973 | A | * | 4/1994  | Truchinski  | 280/276 |
| 5,634,653 | A | * | 6/1997  | Browning    | 280/276 |
| 7,017,893 | B1| * | 3/2006  | Vincenzo    | 267/226 |

OTHER PUBLICATIONS

Printout from Internet web site www.faster-motorcross.com/pro-fork-air-bleeder.html, (2 pages).

* cited by examiner

*Primary Examiner*—Kevin Lee
(74) *Attorney, Agent, or Firm*—Ramon L. Pizarro; Edwin H. Crabtree

(57) ABSTRACT

A pressure relief valve for use on a dampener of a motorcycle suspension system is disclosed. The pressure relief valve includes a hollow body having an aperture that extends through the body, a valve cap that includes a recessed area with an entrance of a first diameter and a mid-portion of a second diameter, the second diameter being larger than the first diameter. Attached to the valve cap is a connecting shaft that is surrounded by a spring that urges the valve cap together with the connecting shaft from a second position where a pair of seals are formed, one a seal is formed between the valve cap and the hollow body and the other seal between the connecting shaft and the aperture in the hollow body, and to a first position where both seals are opened, so that when the valve cap is in the first position the enlarged portion of the connecting shaft creates a flow-path into the aperture through the hollow body.

9 Claims, 4 Drawing Sheets

BLEED VALVE SYSTEM FOR MOTORCYCLE SUSPENSIONS

BACKGROUND OF THE INVENTION (a) Field of the Invention

This application relates to a system and method for adjusting the pressure in the suspension system of a motorcycle. More particularly, but not by way of limitation, this application relates to a valve system for purging gases that become trapped within the fork tubes or suspension of a motorcycle's fork.

(b) Discussion of Known Art

U.S. Pat. No. 4,807,860 to Simons, which is incorporated herein in its entirety by reference, discloses a system for reducing the gas pressure buildup in the dampeners that are part of the front suspension fork of a motorcycle. More particularly, FIG. 8 of the Simmons patent shows a cap that is mounted at the top end of each of the fork tubes or dampeners, and includes a valve mechanism that opens when the fork tubes are fully extended and allows the escape of gases that have built up within the fork tube.

While the Simons device provides relief for the pressure buildup within the fork's dampeners, the mechanism only provides this relief when the fork's dampeners are fully extended. This type of activation, however, presents significant limitations in that opening the valve passage only when the dampeners are fully extended reduces the amount of excess gas that can be released. The dampeners are more than just dashpots, but include both the dampening mechanism and related spring return mechanism that is used to restore the dampener to the appropriate position or length. Excessive trapped gas stiffens the assembly. Thus, leaving too much gas within the dampeners will not restore the dampeners to their designed resting stage, and thus will not completely solve the problem of excessive gas pressure within the fork's dampeners.

Today's fork dampeners are provided with a cap that is installed on the top of the dampener. Each cap includes a vent hole that is covered with a threaded plug or screw. In order to relieve the pressure from excess air or gas buildup, the user must loosen or remove the threaded plug to allow this air or gas to escape. This means that in a motocross race situation, for example, the user must obtain the appropriate wrench or tool, then undo the plug, and then replace the plug with the use of the wrench or tool. This procedure is time consuming, and if the plug is accidentally dropped, can force the rider lose the race.

One known solution is the Pro-Bleeder, which has been offered for sale by Motion Pro, Inc., of San Carlos, Calif. 94070 for more than one year from the date of this application for patent. The Motion Pro device is a valve that fits into the hole on the fork cap that accepts the plug used for bleeding the trapped air or gas from the fork. The Motion Pro device includes a body with a spring-loaded pushbutton that moves a pushrod through the body to move a plug with an O-ring against an aperture at the end to the body. While the Motion Pro device provides a mechanism that allows rapid release of the trapped air or gas with the push of a button, the design has limitations.

One significant limitation of the Motion Pro design is that it only allows the use of a single O-ring, and relies on a seal that is created by compressing the O-ring against a flat surface at the end of the body. By pressing the O-ring against the flat surface the Motion Pro device relies on the force of the spring to ensure that the O-ring deforms and seals against the flat end of the body. This requires a particularly strong spring, which makes the use of the device more difficult, and places unnecessary stress on the O-ring.

Moreover, the Motion Pro device is particularly well suited for motorcycles that are used on dirt tracks or trails. This environment typically includes large amounts of airborne dust and mud, which can enter the valve mechanism of a device like the Motion Pro device and prevent the proper operation of the O-ring.

Therefore, a review of known devices reveals that there remains a need for a simple device that can be used for rapid, reliable release of excess air or gas trapped in the dampeners or struts of the fork of a motorcycle.

There remains a need for a pushbutton pressure relief valve that can be used in place of the pressure relief plug or screw commonly found on the cap of the dampeners or struts of the fork of a motorcycle, which can effectively keep out contaminants from the sealing mechanism of the pressure relief valve and the internal components of the dampeners or struts of the motorcycle.

SUMMARY

It has been discovered that the problems left unanswered by known art can be solved by providing a bleed button, or pressure relief valve that includes:

a valve cap;

a spring;

a connecting shaft, preferably with a bottom piston and a sealing o-ring; and a valve body with at least one O-ring, and preferably with two O-rings, the internal O-ring sealing between the valve body and the connecting shaft, while the other O-ring seals between the valve body and the valve cap.

According to a preferred embodiment of the invention, the valve cap can act as a moving cylinder, performing several important functions produced with the disclosed structure. These functions include opening or closing access to an air escape passage through the air passage inside the valve body. This opening and closing is accomplished through the use of a recessed area in the valve cap, the recessed area including two sections, the sections being of different diameters and connected to one another through a taper angle between the two valve inside diameters.

It is contemplated that the cap will include a center post or boss that includes an internal 0-80 thread that is used to accept the connecting shaft and allow adjustment of the amount that the connecting shaft extends from the valve cap.

According to an example of the invention, the compression spring is nested under the cap in the valve body, and urges the valve formed by the valve cap and the hollow body and the valve formed by the connecting shaft and the aperture through the hollow body at the lower end of the hollow body to the closed position. Thus, in a preferred example of the invention, the spring pressure is pushing the cap upward and is "stopped" by an enlarged portion, or bottom piston, and its mating internal counter bore in the lower end of the valve body.

Thus, it will be understood that connecting shaft with bottom piston links these two valves together providing "timing" or coordination of the opening and closing of these two valves by the adjustment of the length or projection of the connecting shaft from the valve cap.

Thus it will be understood that it is contemplated that the disclosed cylindrical assembly will provide two valves, one valve between the cap and the upper portion of the valve body and one valve at the lower portion of the valve body.

Furthermore, it will be understood that the two valves operate simultaneously, by depressing with a finger on the top valve cap.

The "timing" or coordination of the operation of the two valves can be adjusted by altering the assembled length of the cap and connecting shaft and bottom piston with the thread overlap.

It will be understood that by providing an upper valve between the body and the cap one greatly reduces the possibility of the entry of dust and other debris into the workings of the dampener and the lower valve mechanism. This increased sealing increases the reliability and life of the mechanism by reducing the entry of dust and debris that can lead to wear.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
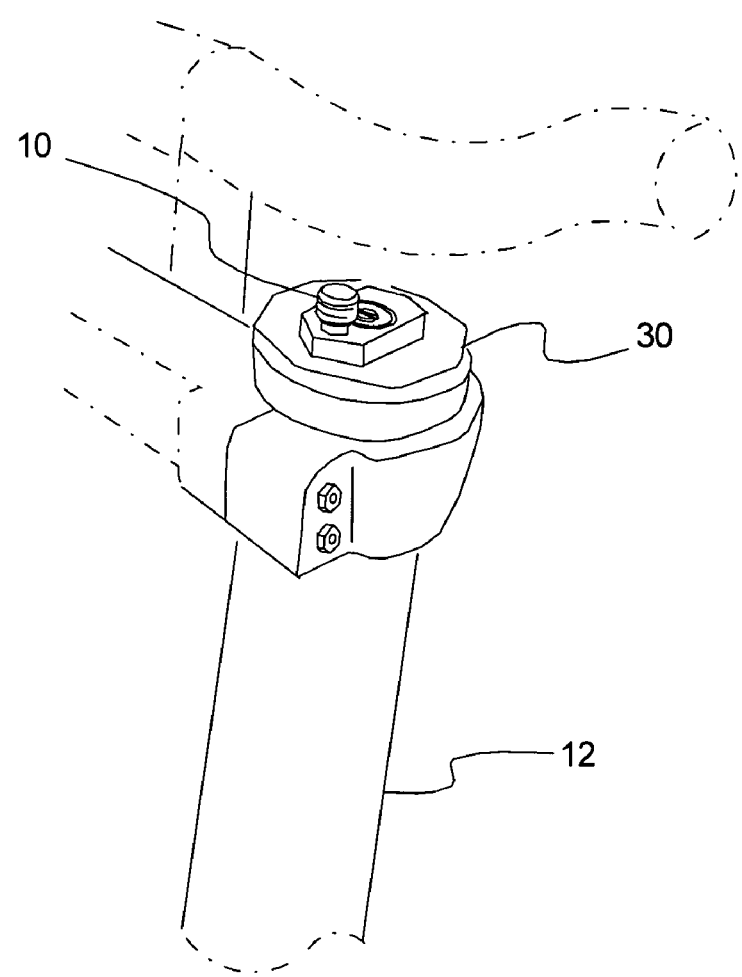
FIG. 1 is a perspective view of an embodiment of the invention installed in the cap in one of the dampeners of a motorcycle fork.
Figure 2:
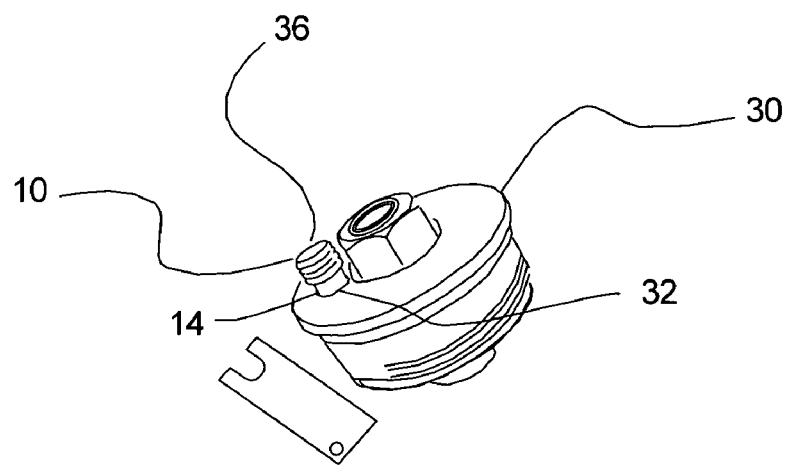
FIG. 2 illustrates the pressure relief valve installed in the cap of the dampener of the motorcycle fork, together with a wrench that allows the easy installation of the disclosed invention.
Figure 3:
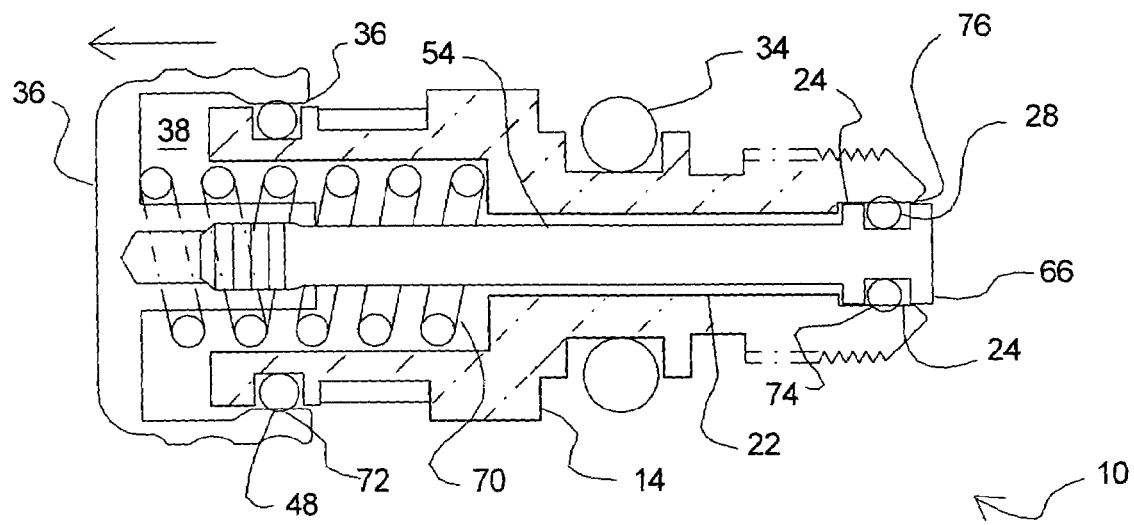
FIG. 3 is a side sectional view of a highly preferred embodiment of the invention while both valves are in the closed position.

Turning now to FIGS. 1-3 where a pressure relief valve 10 for use on a dampener 12 of a motorcycle suspension system has been illustrated. The term "dampener" as used herein is intended to include the individual dampeners of the damping fork, which are also commonly referred to as a "damping unit", which is mounted on the tree of a motorcycle's steering and suspension system. It will be understood that the disclosed pressure relief valve 10 will include a hollow body 14 having an upper end 16 and a lower end 18. The upper end includes an outer surface 20. Additionally, the hollow body 14 will include an aperture 22 that extends from the lower end 18 to the upper end 16 of the hollow body 14.

Figure 4:
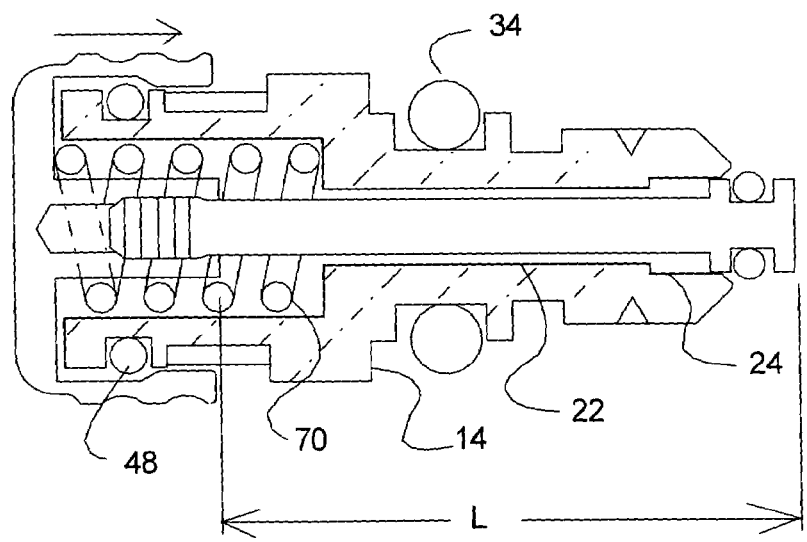
FIG. 4 is a side sectional view of the embodiment illustrated in FIG. 3, while the valves are in the open position.
Figure 6:
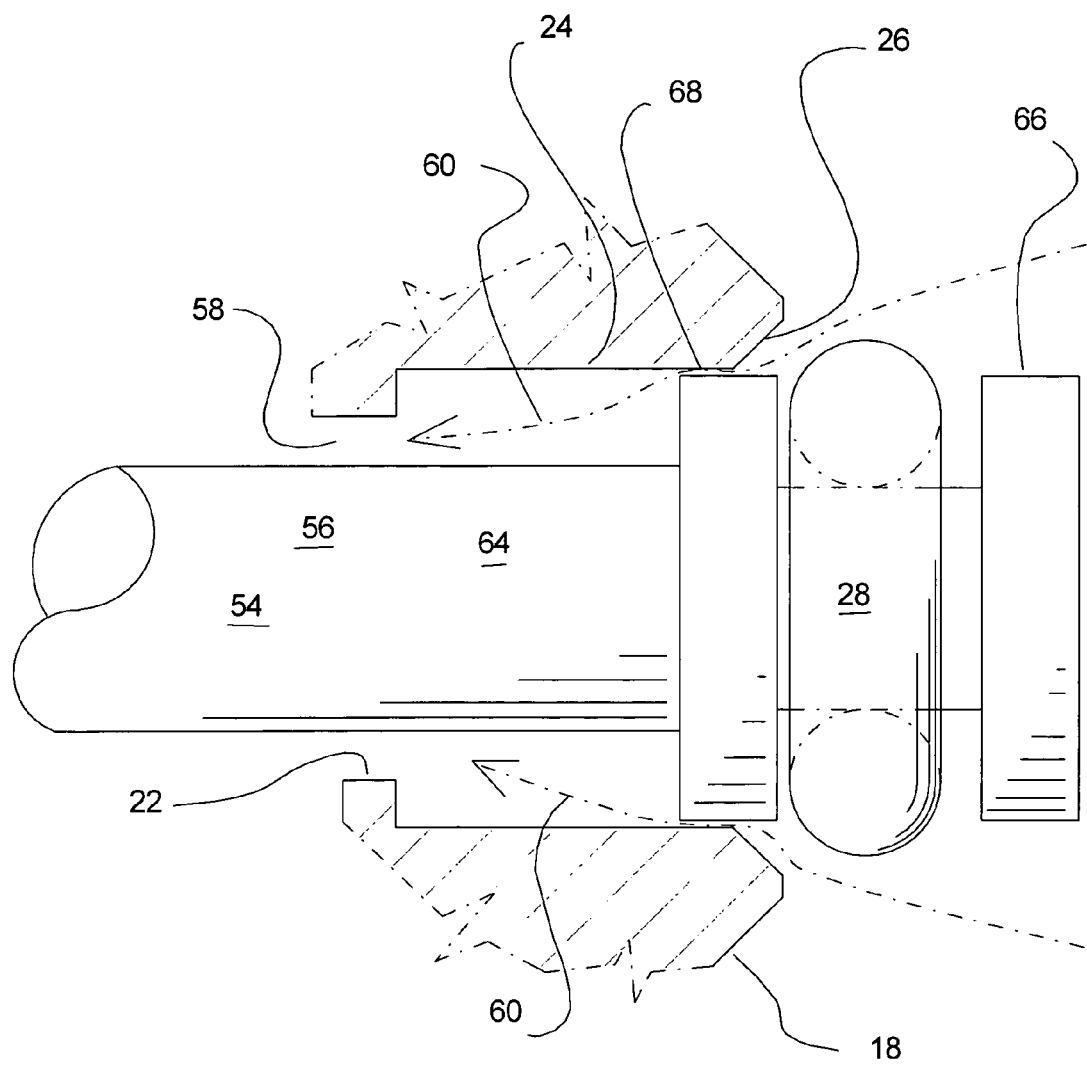
FIG. 6 illustrates the lower end of the body, and through the lower valve and into the aperture through the hollow body, before reaching upper portion of the hollow body as illustrated in FIG. 5.

FIGS. 3, 4, and 6 illustrate that it is contemplated that the aperture 22 will include an enlarged cross-section 24 near the lower end 18. Preferably, the enlarged cross-section 24 will be preceded by a beveled area 26 that will aid in the acceptance of an internal O-ring 28 that is used to seal the lower end 18 of the hollow body 14, and thus prevent the flow of air or any other gases or air-borne materials to and from the dampener 12.

As illustrated in FIGS. 1 and 2, it is contemplated that the disclosed pressure relief valve 10 will be used in the cap 30 of the dampener 12. Commonly used caps 30 include a threaded plug or screw (not shown), which can be removed from the cap, allowing any buildup of excess pressure to be relieved by the user. As explained above, this relief of excess pressure is needed in order to restore the dampener's design characteristics. Thus, the standard design for these dampeners 12 includes a threaded aperture 32 for accepting the threaded plug. It is this threaded aperture that is used to accept the disclosed pressure relief valve 10. Accordingly, the example illustrated in FIG. 3 includes a seating O-ring 34, which is used to create a seal against the dampener cap 30 when the pressure relief valve 10 is seated in the aperture that had originally been used for the threaded plug or screw.

Figure 5:
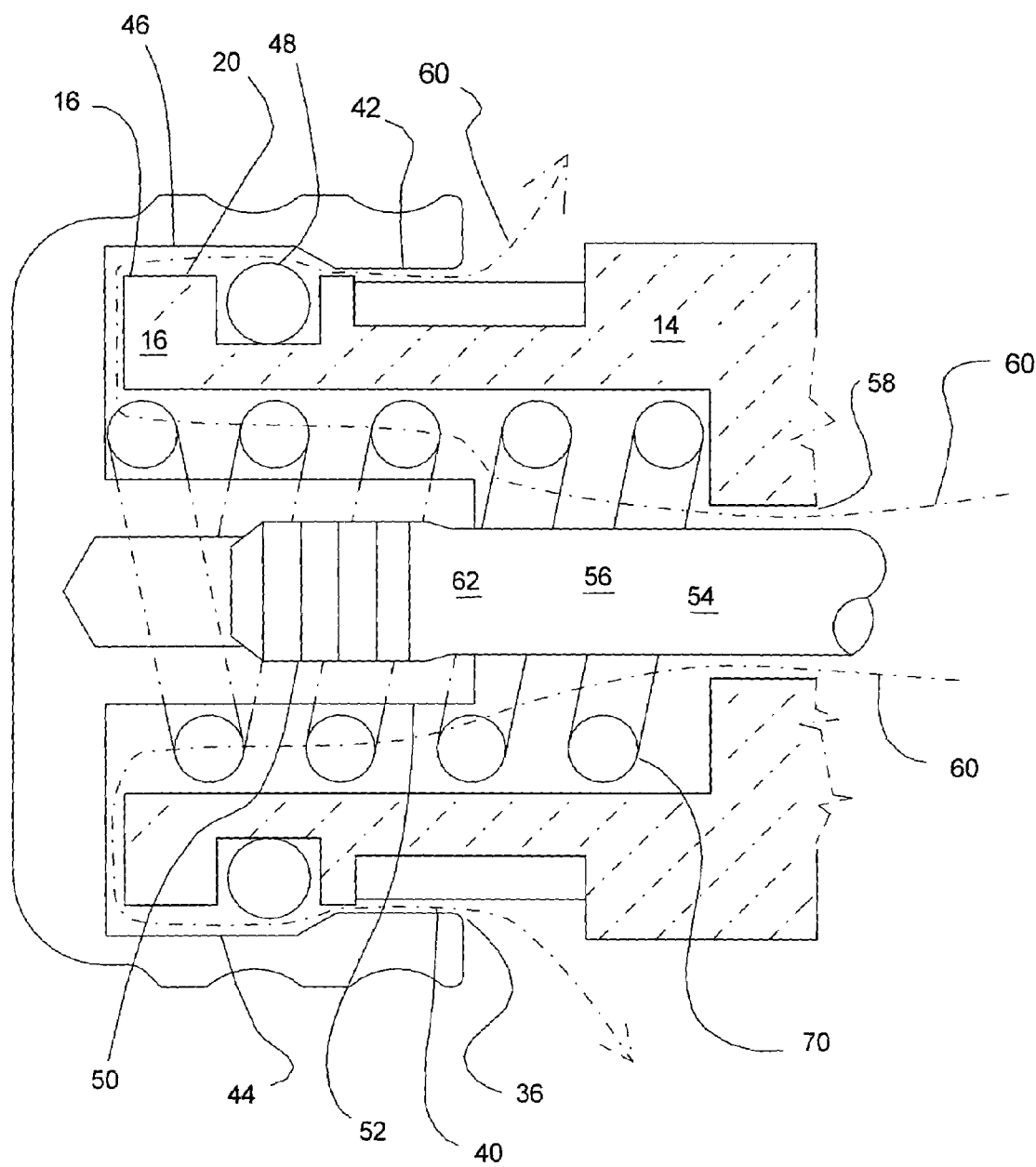
FIG. 5 is an enlargement of the structure below the valve cap, and illustrates the flow path of the air or gasses as they flow through the upper valve and from the disclosed relief valve.

The opening of the disclosed pressure relief valve 10 is accomplished by simply pressing down on a valve cap 36, which has been illustrated in detail in FIGS. 3-5. The illustrations show that it is contemplated that the valve cap 36 will include a recessed area 38 that has been adapted for accepting the upper end 16 of the hollow body 14. Furthermore, the illustrations show that the recessed area 38 will preferably include an entrance 40 of a first diameter 42 and a mid-portion 44 of a second diameter 46. The second diameter 46 being larger than the first diameter 42, so that the section with the smaller diameter can cooperate with an external O-ring 48 in order to form a seal between the valve cap 36 and the outer surface 20 of the upper end 16 of the hollow body 16.

Additionally, FIGS. 3-5 illustrate that the recessed area 38 of the valve cap 36 will also include a threaded section 50, which in the illustrated example is female thread that has been incorporated into a boss 52. The threaded section 50 supports a connecting shaft 54, and provides for adjustment of the length "L" of the connecting shaft 54. It is contemplated that this threaded section 50 may be incorporated into a stud that is accepted by the connecting shaft, or may be incorporated into a simple aperture.

The adjustability of the length "L" of the connecting shaft 54 is important in order to ensure simultaneous sealing of both the internal O-ring 28, which cooperates with the lower end 18 of the hollow body 14, and the external O-ring 48, which seals between the area of the valve cap 30 that is of a first diameter 42 and the outer surface 20 of the upper end 16 of the hollow body 14. This variation in diameters, with the diameter of the deeper portion of the recessed area being the larger than the entrance of the aperture, is commonly referred to as a "face groove".

FIGS. 3-6 illustrate that the connecting shaft 54 has an external surface 56 that fits within the aperture 22 of the hollow body 14 in a spaced-apart relationship, and thus creating a passage 58 that allows a flow 60 of air or gases to escape through the pressure relief valve 10 when the valve cap 36 is pressed in towards the lower end 18 of the hollow body 14, as illustrated in FIG. 4.

Also shown in the accompanying drawings is that the connecting shaft 54 will include a first end 62 and a second end 64. The first end 52 will cooperate with the threaded section 50 of the valve cap 36 and allow adjustment of the distance from the valve cap 36 to the second end 64 of the connecting shaft 54.

As illustrated in FIGS. 3, 4, and 6, the second end of the connecting shaft 54 will preferably include an enlarged portion 66 that cooperates with the lower end 18 of the hollow body 14 to seal the entrance 68 to the aperture 22 by squeezing the internal O-ring 28 into the entrance 68 of the aperture 22 when the valve cap 36 is moved into the closed position, illustrated in FIG. 3.

According to a highly preferred embodiment of the invention, the valve cap 36 is biased to the position where the pressure relief valve 10 is in the closed position, as illustrated in FIG. 3. The force for biasing the valve cap 36 to the closed position is provided by a spring 70, which is positioned around the connecting shaft 54. As illustrated in FIGS. 3-5, the spring 70 is positioned between the valve cap 36 and the hollow body 14, such that the spring 70 urges the valve cap 36 together with the connecting shaft 54 away from the lower end 18 of the hollow body 14 from a first position, illustrated in FIGS. 4-6, where the second end 64 of the connecting shaft 54 and the lower end of the hollow body 14 creates a gap or passage 58, that allows the air to escape. Thus, the passage includes a gap between the valve cap 36 and the outer surface 20 of the hollow body 14 and the gap between second end 64 of the connecting shaft 54 and the entrance 68 of the aperture 22.

When the valve cap is in a second position, illustrated in FIG. 3, the entrance 40 of a first diameter 42 is used to form a first seal 74 between the valve cap 36 and the outer surface 20 of the body 14, while the enlarged portion 66 of the connecting shaft 54 is used to create a second seal 76 between the connecting shaft 54 and the entrance 68 of the aperture 22.

The use of the external O-ring 48 and the internal O-ring 28 provides increased, fail-safe, sealing to the dampener 12. Additionally, the use of the external O-ring 48 prevents the entry of dirt, water, or other foreign substances into the workings of the dampener, creating a system with two layers of protection for the internal workings of the dampener 12.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A pressure relief valve for use on a dampener of a motorcycle suspension system, the pressure relief valve comprising:
   a hollow body having an upper end having an outer surface, a lower end, and an aperture extending from the lower end to the upper end, the aperture having an entrance at the lower end;
   a valve cap, the valve cap having a recessed area adapted for accepting the upper end of the hollow body within the recessed area, the recessed area of the valve cap having an entrance of a first diameter and a mid-portion of a second diameter, the second diameter being larger than the first diameter;
   a connecting shaft, having an external surface that fits within the aperture in a spaced-apart relationship; the connecting shaft having a first end and a second end, the second end having an enlarged portion, the first end being attached to the valve cap;
   a spring, the spring being positioned against the valve cap, such that the spring urges the valve cap away from the second end of the hollow body from a first position where the mid-portion of a second diameter creates a gap between the valve cap and the outer surface of the body and a second position where the entrance of a first diameter is used to form a first seal between the valve cap and the outer surface of the body while the enlarged portion of the connecting shaft is used to create a second seal between the connecting shaft and the entrance of the aperture of the hollow body, and so that when the valve cap is in the first position the enlarged portion of the connecting shaft creates a flow-path into the aperture through the hollow body.

2. A pressure relief valve according to claim 1 and further comprising an external O-ring positioned between the outer surface of the hollow body and the recessed area of the valve cap and an internal O-ring that is positioned between the second end of the connecting shaft and the entrance of the aperture of the body.

3. A pressure relief valve according to claim 1 wherein said connecting shaft is threaded into said valve cap, so that the distance between the second end of the connecting shaft and the valve cap can be adjusted.

4. A pressure relief valve according to claim 2 wherein said external O-ring and said internal O-ring are positioned such that both O-rings do not seal when the valve cap is pushed towards the upper end of the hollow body.

5. A pressure relief valve according to claim 1 wherein said connecting shaft is of an adjustable length, so that the distance between the second end of the connecting shaft and the valve cap can be adjusted.

6. A pressure relief valve for use on a dampener of a motorcycle suspension system, the pressure relief valve comprising:
   a hollow body having an upper end having an outer surface, a lower end, and an aperture extending from the lower end to the upper end, the aperture having an enlarged cross-section near the lower end;
   a valve cap, the valve cap having a recessed area adapted for accepting the upper end of the hollow body within the recessed area, the recessed area of the valve cap having an entrance of a first diameter and a mid-portion of a second diameter, the second diameter being larger than the first diameter, the recessed area containing a threaded section;
   a connecting shaft, having an external surface that fits within the aperture in a spaced-apart relationship, the connecting shaft having a first end and a second end, the second end having an enlarged portion, the first end being attached to the threaded section of the recessed area of the valve cap;

a spring, the spring being positioned around the connecting shaft and between the valve cap and the hollow body, such that the spring urges the valve cap together with the connecting shaft away from the second end of the hollow body from a first position where the mid-portion of a second diameter creates a gap between the valve cap and the outer surface of the body and a second position where the entrance of a first diameter is used to form a first seal between the valve cap and the outer surface of the body while the enlarged portion of the connecting shaft is used to create a second seal between the connecting shaft and the entrance of the aperture of the hollow body, and so that when the valve cap is in the first position the enlarged portion of the connecting shaft creates a flow-path into the aperture of the hollow body.

7. A pressure relief valve according to claim 6 and further comprising an external O-ring positioned between the outer surface of the hollow body and the recessed area of the valve cap and an internal O-ring that is positioned between the second end of the connecting shaft and the entrance of the aperture of the body.

8. A pressure relief valve according to claim 6 wherein said connecting shaft is of an adjustable length, so that the distance between the second end of the connecting shaft and the valve cap can be adjusted.

9. A pressure relief valve according to claim 7 wherein said external O-ring and said internal O-ring are positioned such that both O-rings do not seal when the valve cap is pushed towards the upper end of the hollow body.

\* \* \* \* \*